United States Patent
Tanaka

(10) Patent No.: US 7,961,340 B2
(45) Date of Patent: Jun. 14, 2011

(54) PRINTER, PRINTING SYSTEM AND PRINTING METHOD FOR PREVENTING ABNORMAL PRINTING

(75) Inventor: Tomio Tanaka, Fukushima (JP)

(73) Assignee: Oki Data Corporation, Tokyo (JP)

( * ) Notice: Subject to any disclaimer, the term of this patent is extended or adjusted under 35 U.S.C. 154(b) by 1048 days.

(21) Appl. No.: 11/428,687

(22) Filed: Jul. 5, 2006

(65) Prior Publication Data

US 2007/0008580 A1   Jan. 11, 2007

(30) Foreign Application Priority Data

Jul. 8, 2005   (JP) .................................. 2005-199692

(51) Int. Cl.
  *G06F 3/12* (2006.01)
  *G06K 15/02* (2006.01)
  *H04N 1/00* (2006.01)
  *H03M 13/00* (2006.01)
  *G06K 5/00* (2006.01)

(52) U.S. Cl. ................... 358/1.15; 358/1.2; 358/426.09; 714/758; 714/818

(58) Field of Classification Search ................ 358/1.15, 358/1.2, 426.09; 714/758, 818
See application file for complete search history.

(56) References Cited

U.S. PATENT DOCUMENTS

| 6,304,335 | B1 * | 10/2001 | Furuya et al. .............. 358/1.15 |
| 7,149,291 | B1 * | 12/2006 | Deshpande ............. 379/112.01 |
| 7,515,534 | B2 * | 4/2009 | Sumita ..................... 370/229 |
| 2002/0116522 | A1 * | 8/2002 | Zelig ........................ 709/235 |

FOREIGN PATENT DOCUMENTS

| JP | 63-217456 A | 9/1988 |
| JP | 2000-112678 A | 4/2000 |
| JP | 2000-168206 A | 6/2000 |
| JP | 2004-188865 | 7/2004 |
| JP | 2005-149317 | 6/2005 |

* cited by examiner

*Primary Examiner* — Benny Q Tieu
*Assistant Examiner* — Mesfin Getaneh
(74) *Attorney, Agent, or Firm* — Panitch Schwarze Belisario & Nadel LLP

(57) ABSTRACT

A printer prints a print job having a plurality of blocks each of which has a block size section and corresponding data that should be printed. A receiving section receives the print job from an external apparatus. A comparing section compares a content of the block size section with a threshold value. When the content of the block size section exceeds the threshold value, a discarding section discards a subsequent portion of the data. The threshold value is set to a user's desired value.

8 Claims, 8 Drawing Sheets

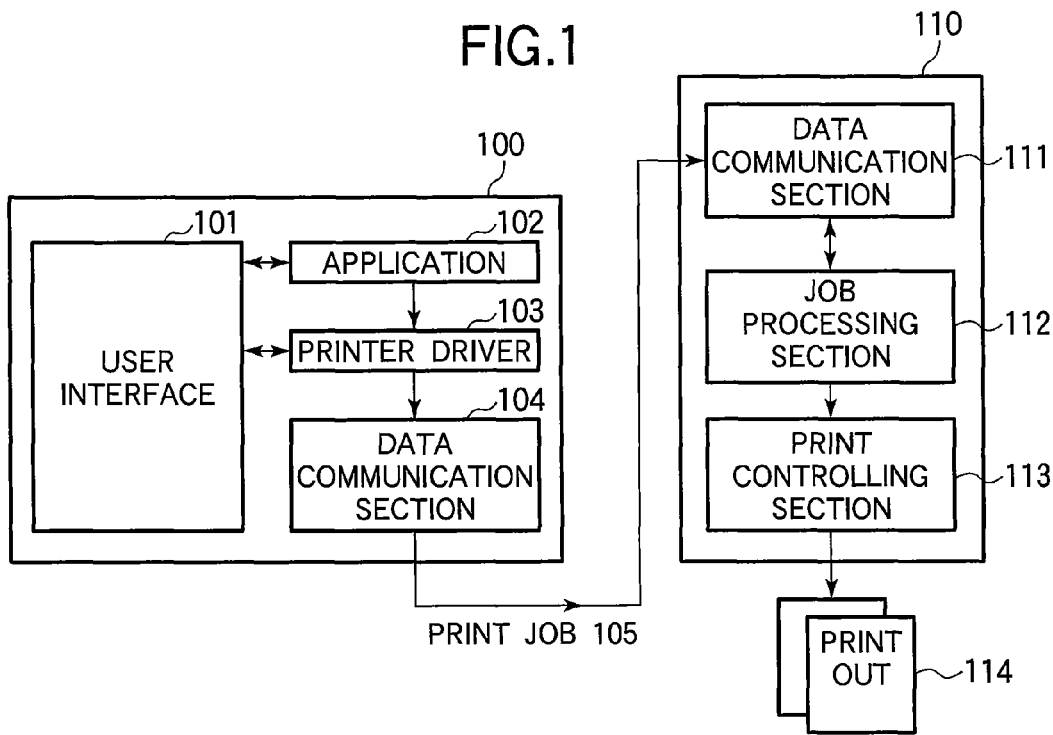
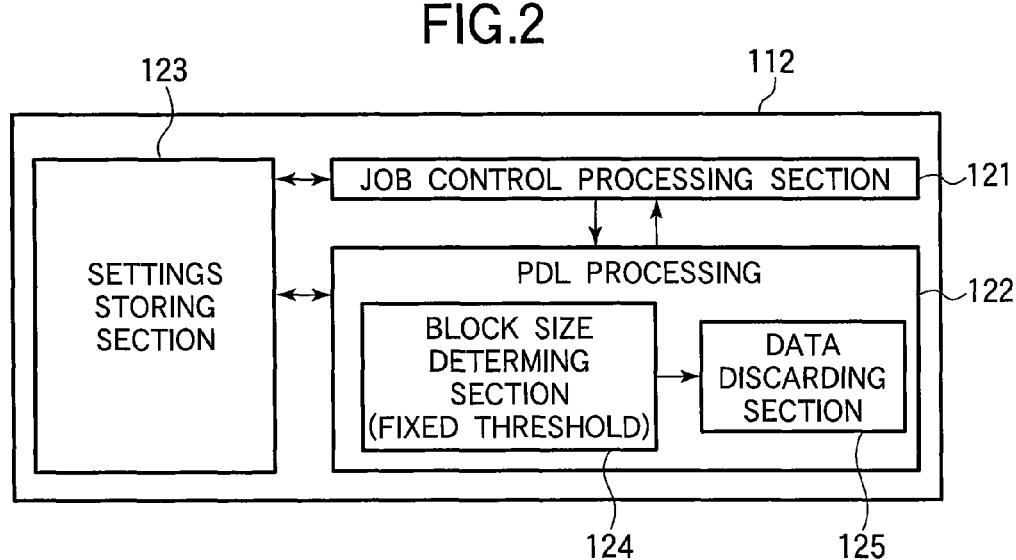

PRINTER, PRINTING SYSTEM AND PRINTING METHOD FOR PREVENTING ABNORMAL PRINTING

BACKGROUND OF THE INVENTION

1. Field of the Invention

The invention relates to a printer that performs printing via a communication line, and more particularly to a technology that detects abnormal communications and prevents abnormal printing operations.

2. Description of the Related Art

Conventional printers often receive communication data containing abnormal data such as missing data due to noise in the communication lines and/or improper timings in data communications between a printer and a host apparatus.

In order to prevent abnormal data from being printed, printing may be stopped when undefined print commands are received. However, if an undefined command has become erroneously garbled into a normal command due to data collection or extraction faults, the error cannot be detected. The result is advertent printing of abnormal data.

Another drawback is that even if print data has become garbled into control data such as new page control, the "new page control" is a defined control command and therefore cannot be interpreted as a garbled command. The result is that pages are broken every time several words are printed, outputting a large number of pages.

One way of avoiding the aforementioned drawbacks is to use the fact that it is rare to print only one line at the top of a page if printing is normally performed. In other words, if there is only one line at the top of a page of a document that is being created, received data is interpreted as abnormal data and the following data is discarded.

However, it is not always abnormal that a page ends with only one line at the top. Therefore, printing of abnormal data cannot be prevented by discarding the following data if there is only one line at the top of a page.

Another way of avoiding the aforementioned drawback is to perform parity check and error correction of data. However, such error check is not performed in the Centronics interface for general purposes, and therefore parity check and error correction of data cannot prevent abnormal data from being printed.

SUMMARY OF THE INVENTION

An object of the invention is to provide a printer to ensure that abnormal printing is reliably prevented.

An object of the invention is to provide a printer in which missing data can be reliably detected irrespective of where in the print data the missing data occurs.

A printer prints a print job having a plurality of blocks each of which has a block size section and corresponding data that should be printed. The printer includes a receiving section, a comparing section, and a discarding section. The receiving section receives the print job from an external apparatus. The comparing section compares a content of the block size section with a threshold value. The discarding section discards a subsequent portion of the data when the content of the block size section exceeds the threshold value.

The threshold value is set to a user's desired value.

A printing system includes an information processing apparatus that produces a print job and a printing apparatus that receives the print job from the information processing apparatus and prints the print job. The information processing apparatus includes a dividing section, a job producing section, and a transmitting section. The dividing section divides the print data into a plurality of blocks each of which having a block size section that holds a block size therein. The job producing section produces the print job that contains the print data that should be printed. The transmitting section transmits the print job to the printing apparatus. The printing apparatus includes a receiving section, a comparing section, and a discarding section. The receiving section receives the print job from the information processing apparatus. The comparing section compares a content of the block size section with a threshold value. The discarding section discards a subsequent portion of the print data that should be printed when the content of the block size section exceeds the threshold value.

The threshold value is set to a user's desired value.

The printing system further includes a setting section that sets the threshold value.

A method of printing includes:

dividing data into a plurality of blocks each of which includes a block size section and data that should be printed, and then storing a block size into the block size section;

producing a print job that includes the data;

transmitting and receiving the print job;

comparing the block size with a threshold value; and discarding a subsequent portion of the data when the block size exceeds the threshold value.

The method further includes setting the threshold value to a user's desired value.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 1 illustrates the configuration of a printing system according to the first embodiment;

FIG. 2 illustrates the configuration of a print job processing section in FIG. 1;

DETAILED DESCRIPTION OF THE INVENTION

Figure 3:
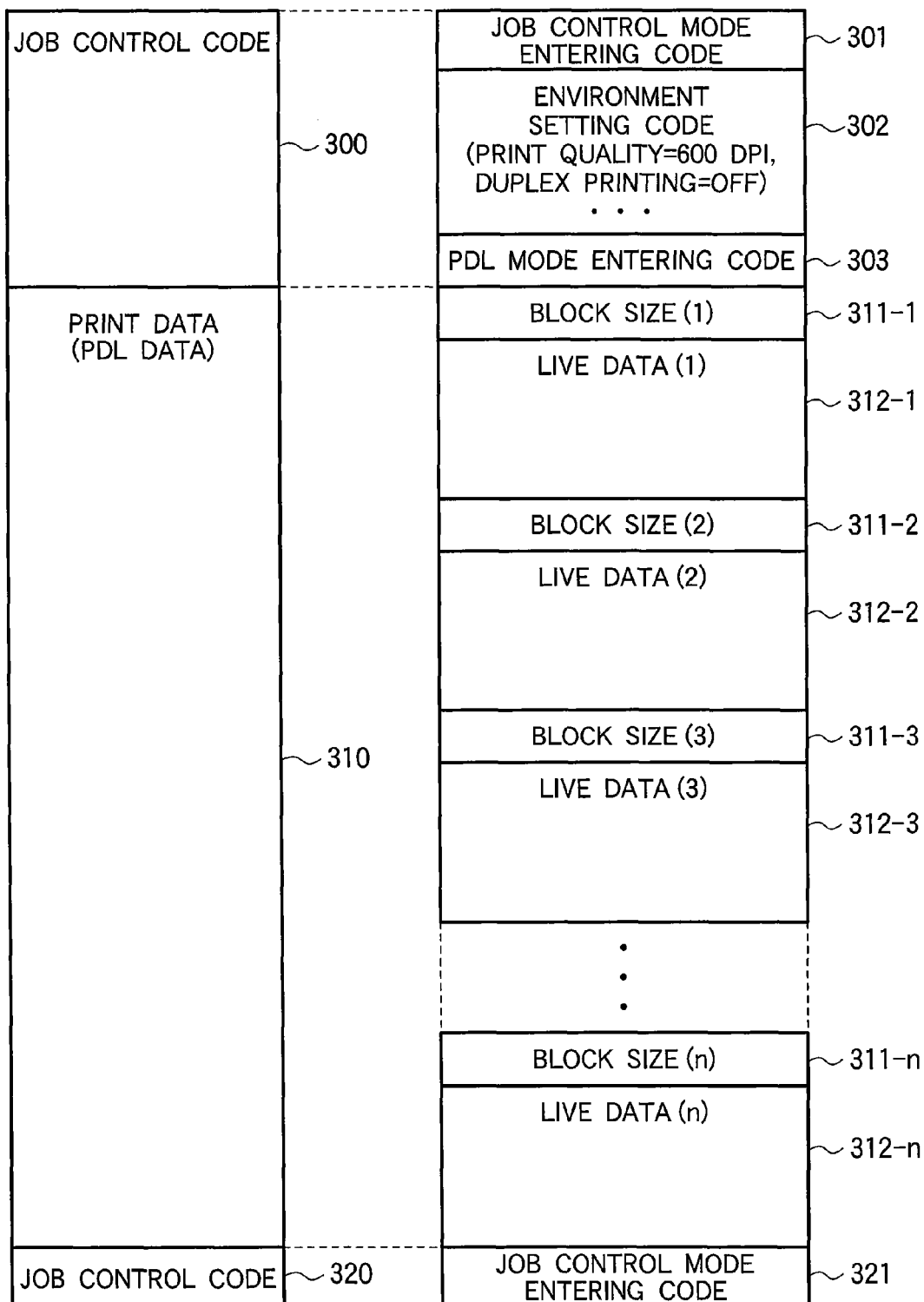
FIG. 3 illustrates the data configuration of a print job according to the first embodiment.

Embodiments of the invention will be described with reference to the accompanying drawings. The embodiments will be described in terms of the Centronics interface. However, the present invention may also be applied to interfaces such as USB interface, LAN interface, and wireless interface.

First Embodiment

A printer according to a first embodiment prints data formed of a plurality of blocks, each block containing data indicative of the size of the block. The printer checks each block to determine whether the size of the block has exceeded a predetermined threshold value, thereby detecting abnormal data.

{Configuration of Printing System and Host Apparatus}

FIG. 1 illustrates the configuration of a printing system according to the first embodiment. The printing system includes a host apparatus 100 such as PCs connected to a printer via an interface such as the Centronics interface. The host apparatus 100 serves as an information processing apparatus.

The host apparatus 100 includes an application 102 that is an application program, a printer driver 103 that produces job control codes and printer data, and a data transmitting-and-receiving section 104 that controls transmitting and receiving of the data produced by the printer driver 103.

The printer driver 103 produces image data that contains text documents produced by the application 102, and transmits the image data to a printer 110 via the data transmitting and receiving section 104. For the sake of convenience, in the specification, the term print job 105 covers the data produced by the printer driver 103 upon one print command received from the application 102.

The printer driver 103 converts the image data, produced by the application 102, into PDL data expressed in page description language (PDL) so that the image data can be processed in the printer 110. The printer driver 103 also has functions for adding a job control code, which is based on a code system different from PDL, to the PDL data so that printed results reflect various print settings specified by the user through the user interface 101 such as print quality (e.g., resolution) and duplex printing.

{Data Configuration of Print Job}

FIG. 3 illustrates the data configuration of the print job 105 according to the first embodiment. Referring to FIG. 3, the print job 105 includes a job control code section 300, a print data section 310, and a job control code section 320 arranged in this order.

The job control code section 300 includes a job control mode entering code 301, an print environment setting code 302, and a PDL mode entering code 303. The print environment setting code 302 describes print settings such as print quality and duplex printing. For example, print quality is 600 dpi and duplex printing is "OFF" in FIG. 3.

The print data section 310 includes a block size section 311 including BLOCK SIZE (1) 311-1, BLOCK SIZE (2) 311-2, . . . and BLOCK SIZE (n) 311-n; LIVE DATA (1) 312-1, LIVE DATA (2) 312-2, . . . , and LIVE DATA (n) 312-n.

The job control code section 320 includes a job control mode entering code 321, which is the same as the job control mode entering code 301.

The block size section 311 has a predetermined length of, for example, two bytes to eight bytes, and describes the data size of, for example, the corresponding live data section 312, which will be described later.

The live data section 312 contains print data divided into a plurality of blocks each of which has a predetermined size. The size of each block is less than a predetermined threshold value. The printer driver 103 writes the print data into the respective blocks when the print data is produced.

The threshold value of the block size should be determined by considering a maximum length of the command and allowing a predetermined margin. For example, the block size should be such that a block contains a predetermined number of commands having a maximum length and a bit map image as a parameter.

The threshold value is such that the upper most byte is "00" (H) and the remaining bytes do not contain "00" (H). The symbol (H) represents hexadecimal data. As described later in more detail, the provision of the threshold value makes it possible to detect missing one-byte data in most cases.

If two bytes are missing, the block size section may be configured such that each BLOCK SIZE contains three or more bytes, and upper two bytes of the threshold value is, for example, "0000" (H).

{Configuration of Printer}

The printer 110 includes a data transmitting and receiving section 111, a later described print job processing section 112, and a print controlling section 113. The data transmitting-and-receiving section 111 communicates data with the host apparatus 100. The print controlling section 113 directs the print data, produced in the print job processing section 112, to a print engine, and controls printing in accordance with the print data.

FIG. 2 illustrates the configuration of a print job processing section. Referring to FIG. 2, the print job processing section 112 includes a job control processing section 121, a settings storing section 123, and a PDL processing section 122. The job control processing section 121 processes data that corresponds to the job control code sections 300 and 320 of the data received via the data transmitting-and-receiving section 111. The settings storing section 123 stores print settings set by the print environment setting code 302. The PDL processing section 122 processes data, which corresponds to the print data section 310, in accordance with the print settings stored in the settings storing section 123.

The PDL processing section 122 includes a block size determining section 124 and a data discarding section 125. The block size determining section 124 processes the live data while determining whether the block size in the print data is larger or smaller than the threshold of the block size held in the PDL processing section 122. If it is detected that some of data is missing, the data discarding section 125 discards the subsequent data until a job termination code, i.e., the job control mode entering code 321 is detected.

Then, except for the data processed in the data discarding section 125, the print data which is processed in the PDL processing section 122 is printed out as print output 114 by the print controlling section 113.

{Operation}

Figure 4:
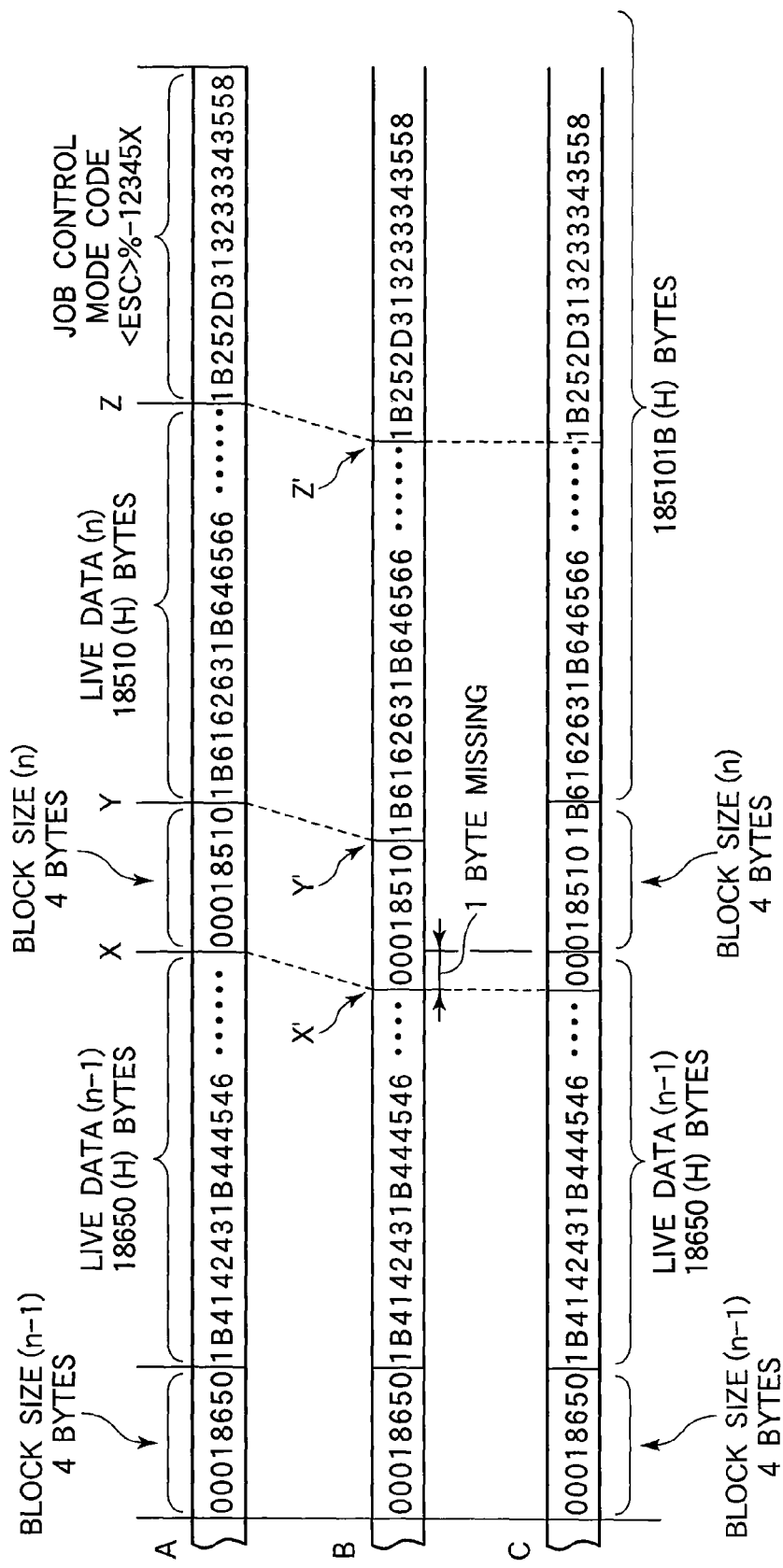
FIG. 4 illustrates data that is partly missing.
Figure 5:
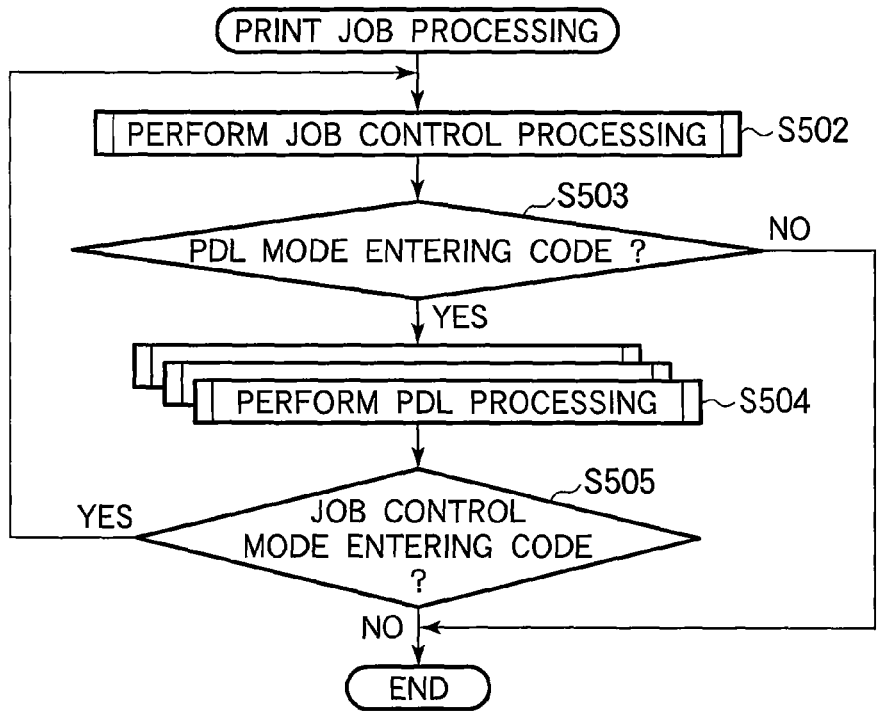
FIG. 5 is a flowchart illustrating the operation of the printer according to the first embodiment.
Figure 8:
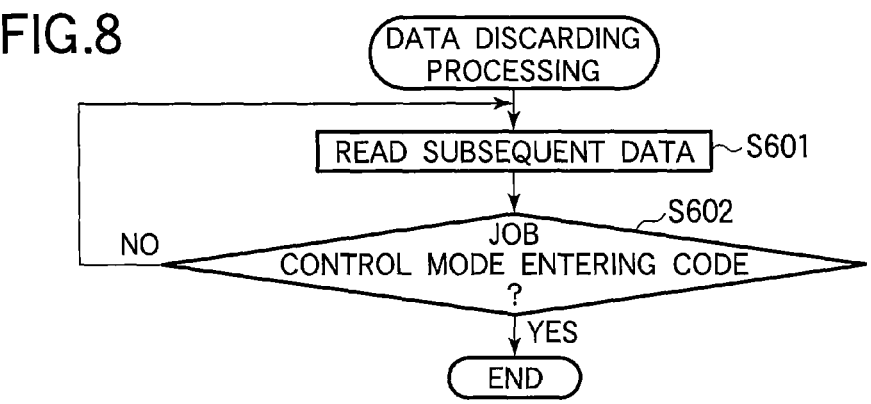
FIG. 8 is a flowchart illustrating the operation of the printer according to the first embodiment.

The operation of the printer of the aforementioned configuration will be described with reference to FIGS. 4, 5 and 8. FIG. 4 illustrates data that is partly missing. FIG. 5 and FIG. 8 are flowchart illustrating the operation of the printer according to the first embodiment.

{When Print Job Is Missing One Byte}

FIGS. 4A and 4B illustrate an example of the print job 105 whose one byte is missing due to, for example, noise. FIG. 4A illustrates the original data of the print job produced in the printer driver 103. FIG. 4B illustrates the data received in the printer 110, the data is missing one byte from LIVE DATA (n−1). One byte of missing data is most likely to occur. The block size section has a predetermined length, e.g., four bytes in the embodiment.

Referring to FIG. 4B, when one byte of data is missing, the data subsequent to the missing data shifts by 1 byte. Therefore, the top of the BLOCK SIZE (n) shown in FIG. 4A will appear at position X' in FIG. 4B. Likewise, the top of the LIVE DATA (n) will appear at position Y', and the top of the job control mode entering code will appear at position Z'.

The value of BLOCK SIZE (n) following LIVE DATA (n−1) should be "00018510" (H), i.e., "18510" (H) if no erroneous data occurs. However, because the data shifts by 1 byte, the resulting BLOCK SIZE (n) is "0185101B" (H), i.e., "185101B" (H).

Referring to FIGS. 4A and 4B, the values of BLOCK SIZE (n−1) and BLOCK SIZE (n) are different from each other. This is due to the fact that the respective block includes an arbitrary number of commands and therefore the block size differs from block to block.

{Processing Print Job}

The processing of the print job in the printer 110 will be described with reference to the flowchart in FIGS. 5 and 8. The respective items of processing are terminated when data cannot be received within a predetermined time frame or when an EOF packet is received through the network. However, their description is omitted for the sake of simplicity.

Figure 6:
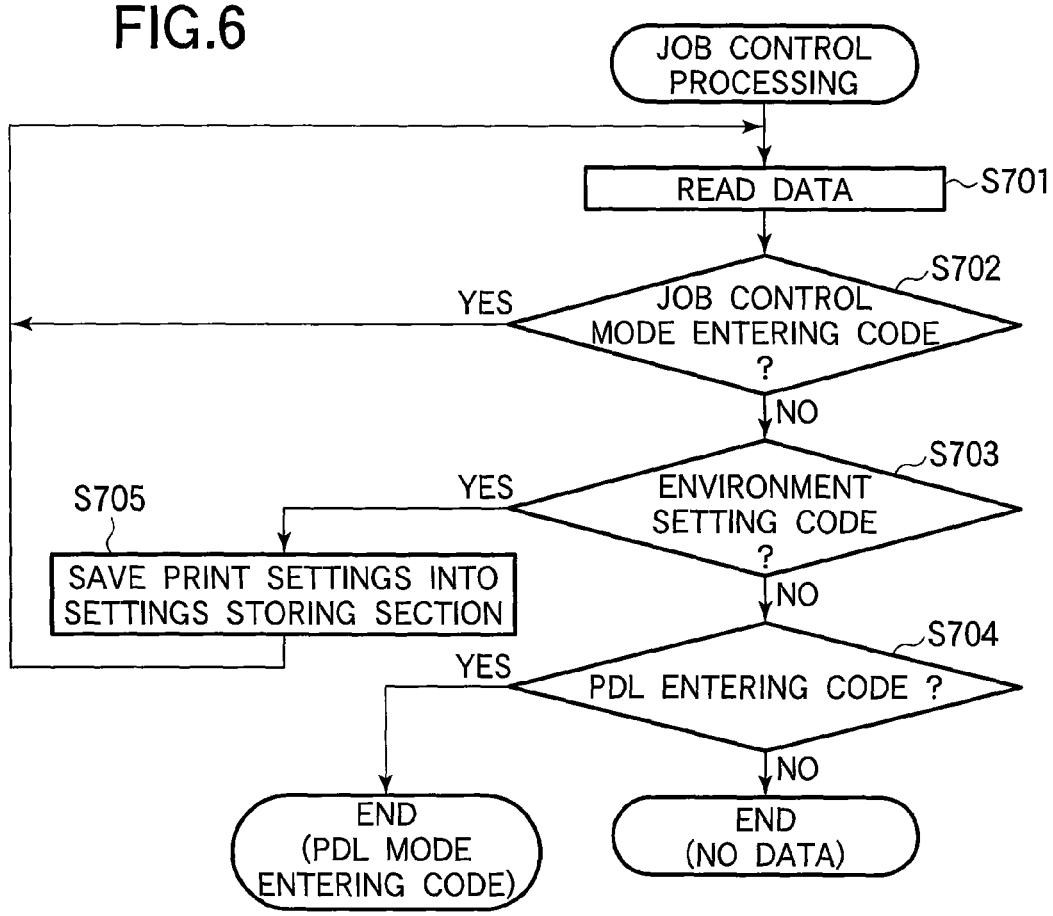
FIG. 6 illustrates the job control processing performed at step S502 in FIG. 5.

Referring to FIG. 5, a job control processing is first performed (step S502). The detail of the job control processing is illustrated in FIG. 6.

After the job control processing has been terminated, a check is made to determine whether the job control processing was terminated due to detection of the PDL mode entering code 303 (step S503). If the answer is YES, then the program proceeds to step S504 where the PDL processing is performed.

Figure 7:
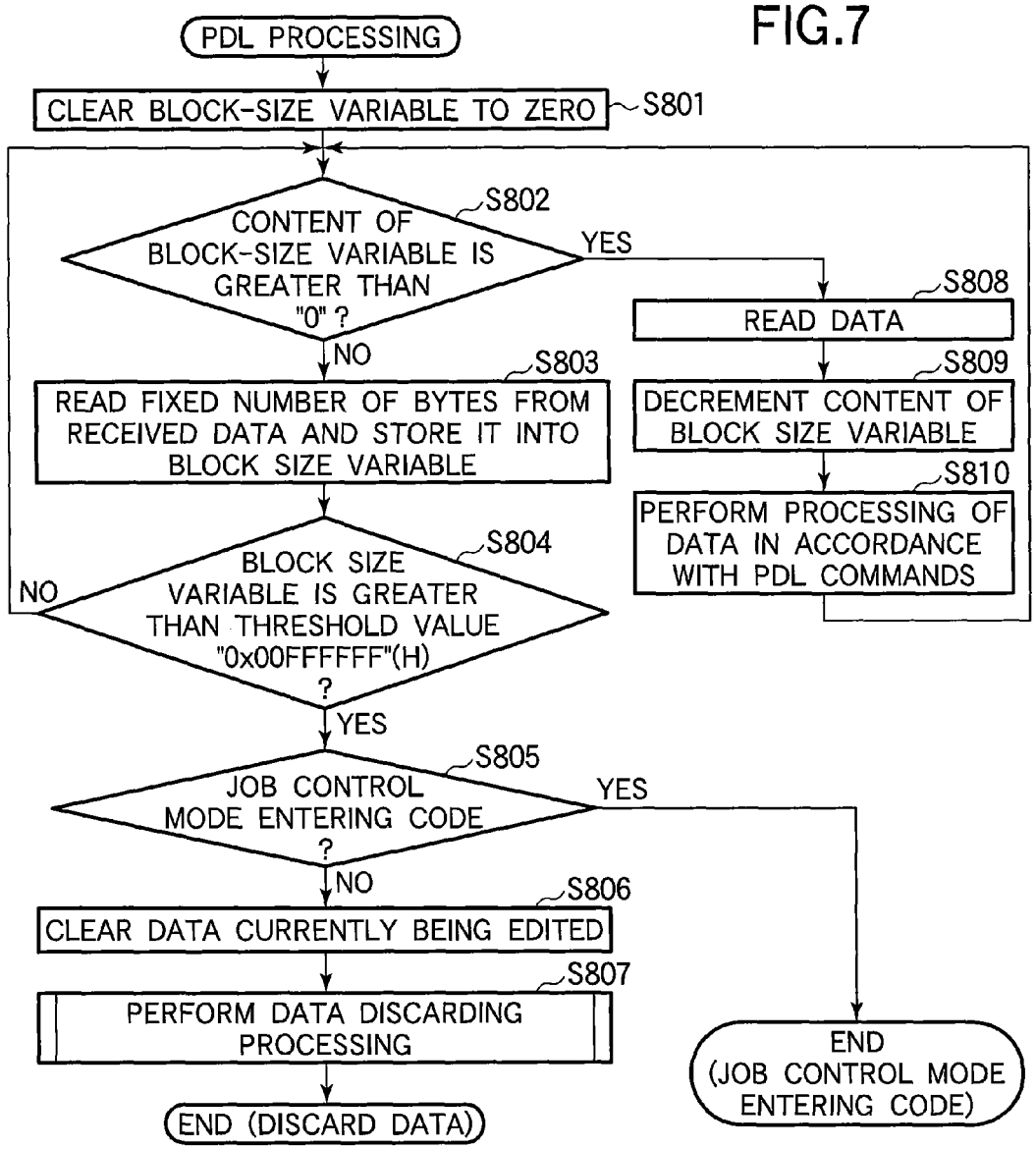
FIG. 7 illustrates the PDL processing in the job control processing performed at step S504 in FIG. 5.

After the PDL processing is terminated in FIG. 7, a check is made to determine whether the PDL processing (step S504) is terminated due to detection of the job control mode entering code 321 (step S505). If the answer is YES, it indicates that the data was received normally, and the program returns to step S502.

{Job Control Processing in Print Job Processing}

FIG. 6 illustrates the job control processing performed at step S502 in FIG. 5.

The job control processing is performed to read the received data of a predetermined size (step S701). Then, a check is made to determine whether the read data is the job control mode entering code 301 or the job control mode entering code 321. If the answer is either the job control mode entering code 301 or the job control mode entering code 321, the program proceeds to step S701 (step S702).

If the answer is neither the job control mode entering code 301 nor the job control mode entering code 321, the program proceeds to step S703 where a check is made to determine whether the read data is the print environment setting code 302. If the answer is the print environment setting code 302, then print settings that correspond to the print environment setting code 302 are stored into the settings storing section 123 (step S705), and then the program returns to step S701. The print settings include, for example, print quality and duplex printing.

If the answer is not the print environment setting code 302, the program proceeds to step S704 where a check is made to determine whether the read data is the PDL mode entering code 303. If the answer is the PDL mode entering code 303, the job control processing is terminated.

The aforementioned steps are repeated until there is no data of the print job that should be read at step S701, and then the job control processing is terminated due to the fact that no data is available.

{PDL Processing Performed in Print Job Processing}

FIG. 7 illustrates the PDL processing in the job control processing performed at step S504 in FIG. 5.

First, a BLOCK-SIZE VARIABLE, which is a variable used in the PDL processing, is cleared to zero (step S801). Then, a check is made to determine whether the content of the BLOCK-SIZE VARIABLE is greater than "0" (step S802). If the answer is NO, it is determined that the first block of the received data is going to be read and the block size of the first block is going to be identified. Thus, the job control processing section 112 reads a fixed number of bytes (e.g., 4 bytes in this embodiment) from the received data, and stores the fixed number of bytes into the BLOCK-SIZE VARIABLE (step S803). The 4 bytes held in the BLOCK SIZE VARIABLE are then compared with a predetermined threshold held in the THRESHOLD VARIABLE (step S804).

For BLOCK SIZE (n) when the data is received normally (FIG. 4A), the block size is "00018510" (H), i.e., at position X. Thus, "00018510" (H) is stored into the BLOCK SIZE VARIABLE. The content of the BLOCK SIZE VARIABLE is then compared with the content of the THRESHOLD VARIABLE.

Print Job Control Language (PJL) is a job control code developed by HEWLETT-PACKARD. The job control mode entering code is expressed as "<ESC>%−12345X". This can be expressed by an ASCII character code (hexadecimal) "1B252D313233343558" (H) in which "1B (H)" denotes <ESC>, "25 (H) denote "%", "2D" (H) denoted "−", "31" (H) denotes "1", and "32" (H) denotes "2" etc.

As described above, control codes do not usually begin with NULL, i.e., "00" (H). Therefore, the threshold of the block size is expressed by "00FFFFFF" (H) so that the block size can be easily distinguished from the job control mode entering code.

For detecting missing data having a 1-byte length, the threshold may be another value having the upper-most byte equal to "00" (H). For example, the threshold may be "00EFFFFF" (H) or "008FFFFF" (H).

A check is made to determine whether the content of the BLOCK SIZE is larger than the content of the THRESHOLD VARIABLE (step S804). If the answer is NO, it is determined that there is no missing data, and the program loops back to step S802. Because the block size read at step S803 is not "0," the program proceeds to step S808 where the next data is read.

For BLOCK SIZE (n) in FIG. 4A, the content of BLOCK SIZE (n) is "00018510" (H) and the threshold is "00FFFFFF" (H), and therefore the content of BLOCK SIZE (n) is smaller than the threshold and is not "0." Thus, the program proceeds to step S808.

The print job processing section 112 reads the received data having as large an amount of data as is specified by a corresponding command (step S808), and the content of the BLOCK SIZE VARIABLE is then decremented correspondingly (step S809). Then, processing of the data is performed in accordance with the corresponding commands written in PDL (step S810). Then, the program loops back to step S802.

BLOCK SIZE(n) in FIG. 4A holds "00018510" (H). The print job processing section 112 reads as large an amount of received data as "18510" (H), i.e., from position Y to position Z, and decrements the BLOCK SIZE VARIABLE by "18510" (H) so that the content of the BLOCK SIZE VARIABLE becomes "0."

At step S804, if the content of the BLOCK SIZE VARIABLE is larger than the content of the THRESHOLD VARIABLE, a check is made to determine whether the data read is a part of the job control mode entering code 321 (step S805). If the answer is YES, then the PDL processing is terminated normally.

For BLOCK SIZE(n) in FIG. 4A, when the program loops back from S810 to S802, the content of the BLOCK SIZE VARIABLE is "0." The print job processing section 112 reads 4-byte data starting from position Z (step S803), and the BLOCK SIZE VARIABLE holds "1B252D31" (H) (step S803). The value "1B252D31" (H) is compared with the threshold "00FFFFFF" (H) (step S804). Because "1B252D31" (H) is larger than the threshold "00FFFFFF" (H), the program proceeds to step S805 where the value "1B252D31" (H) in the BLOCK SIZE VARIABLE is compared with the upper 4 bytes of the job control mode entering code "1B252D313233343558" (H). The value of "1B252D31" (H) in the BLOCK SIZE VARIABLE is equal to the upper 4 bytes of the job control mode entering code, and therefore the PDL processing is terminated.

If the content of the BLOCK-SIZE VARIABLE is larger than the content of the THRESHOLD VARIABLE, and differs from the job control mode entering code, it is determined that some portion of the LIVE DATA is missing. In order to prevent abnormal printing, the data for a page which is being currently edited and has not been sent to the print controlling section 113, is cleared (step S806). Then, the discarding processing in FIG. 8 is performed where the job control processing section 112 reads the subsequent data (steps S601) and discards the subsequent data read at step S601 until the job control mode entering code 321 is detected (S602).

If LIVE DATA(n-1) is missing one byte as shown in FIG. 4B, the job control processing section 112 reads 4-bytes starting from position X when the BLOCK SIZE(n) is read. Thus, the value "0185101B" (H) is stored into the BLOCK-SIZE VARIABLE (step S803). The value of "0185101B" (H) is larger than the value of "00FFFFFF" (H), i.e., the content of the THRESHOLD VARIABLE. Therefore, the program proceeds to step S805 where the content in the THRESHOLD VARIABLE is compared with the value of "1B252D31" (H) in the BLOCK SIZE VARIABLE, which is the upper 4 bytes of the job control mode entering code "1B252D313233343558" (H). Because the value of "0185101B" (H) is not equal to the value of "1B252D31" (H), the data is discarded (step S807) and the PDL processing is terminated.

The fact that the PDL processing was terminated not due to detection of the job control mode entering code 321 implies that the received data is missing one byte and therefore the data discarding processing is carried out at step S807. Thus, the printing job processing is terminated.

{Advantage of the First Embodiment}

As described above, the print data is divided into a plurality of blocks each of which contains LIVE DATA and a corresponding BLOCK SIZE that represents the size of the LIVE DATA. The content in each BLOCK SIZE is compared with a predetermined threshold, thereby detecting abnormal data. This ensures that missing data in any part of the print job is detected.

Second Embodiment

A threshold is compared with the content of a BLOCK SIZE of a block to determine whether LIVE DATA in the block is abnormal. In a second embodiment, the threshold can be set to a user's desired value.

{Configuration of Printing System and Printer}

Figure 9:
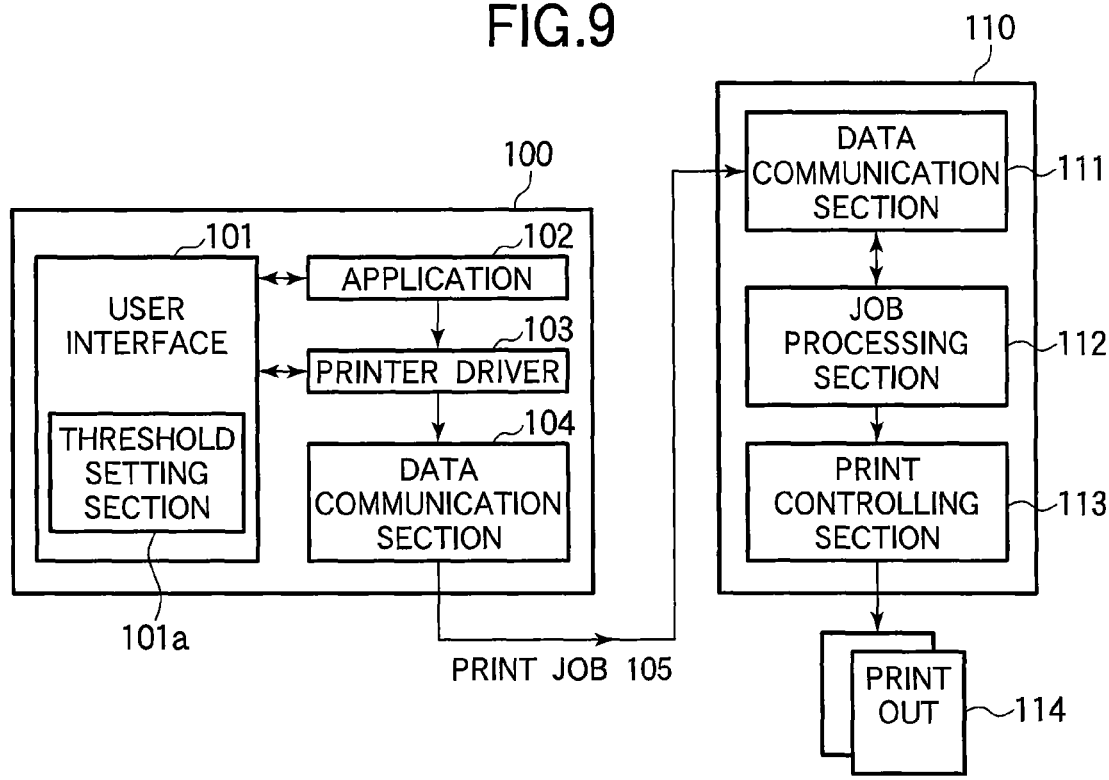
FIG. 9 illustrates the configuration of a printing system according to a second embodiment.

FIG. 9 illustrates the configuration of a printing system according to the second embodiment.

Referring to FIG. 9, a user interface 101 of a host apparatus 100 includes a threshold setting section 101a that sets a threshold as a criterion for determining abnormal data. A user is allowed to set a desired threshold in accordance with the communication environments or to modify the threshold depending on the model or type of the printer 110

Figure 10:
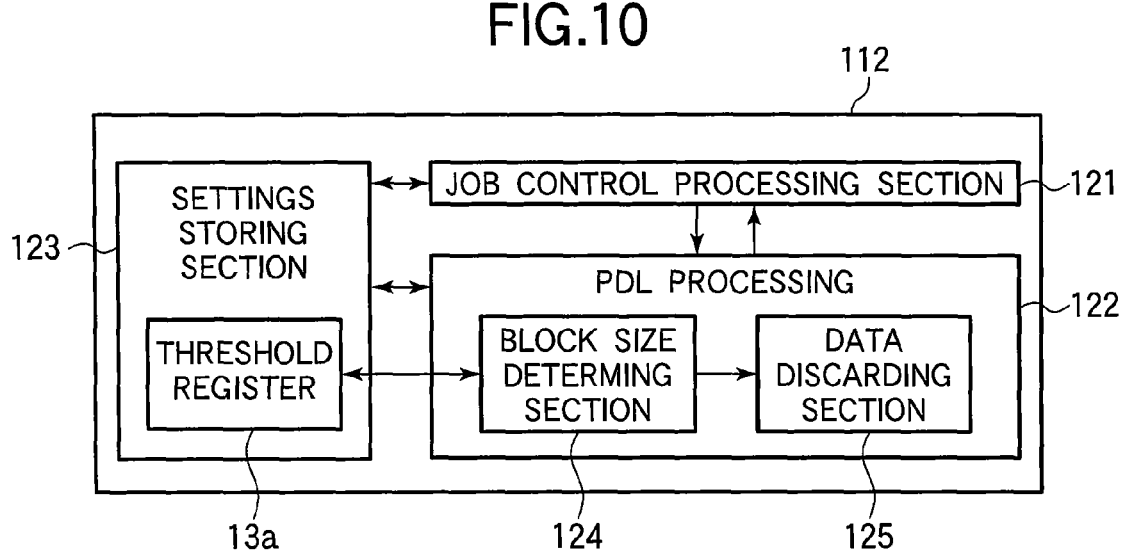
FIG. 10 illustrates the configuration of a print job processing section in FIG. 9.

FIG. 10 illustrates the configuration of a print job processing section in FIG. 9.

Referring to FIG. 10, the threshold set in the threshold setting section 101a is transmitted to the printer 110, and the threshold is stored into a threshold register 123a of the printer 110.

The rest of the configuration is the same as that in FIG. 1 and FIG. 2 and the detailed description is omitted.

{Configuration of Print Job}

A host apparatus 100A transmits a print job 105 that contains a job control code section 300, a print data section 310, a final job control code section 320, which are arranged in this order.

Figure 11:
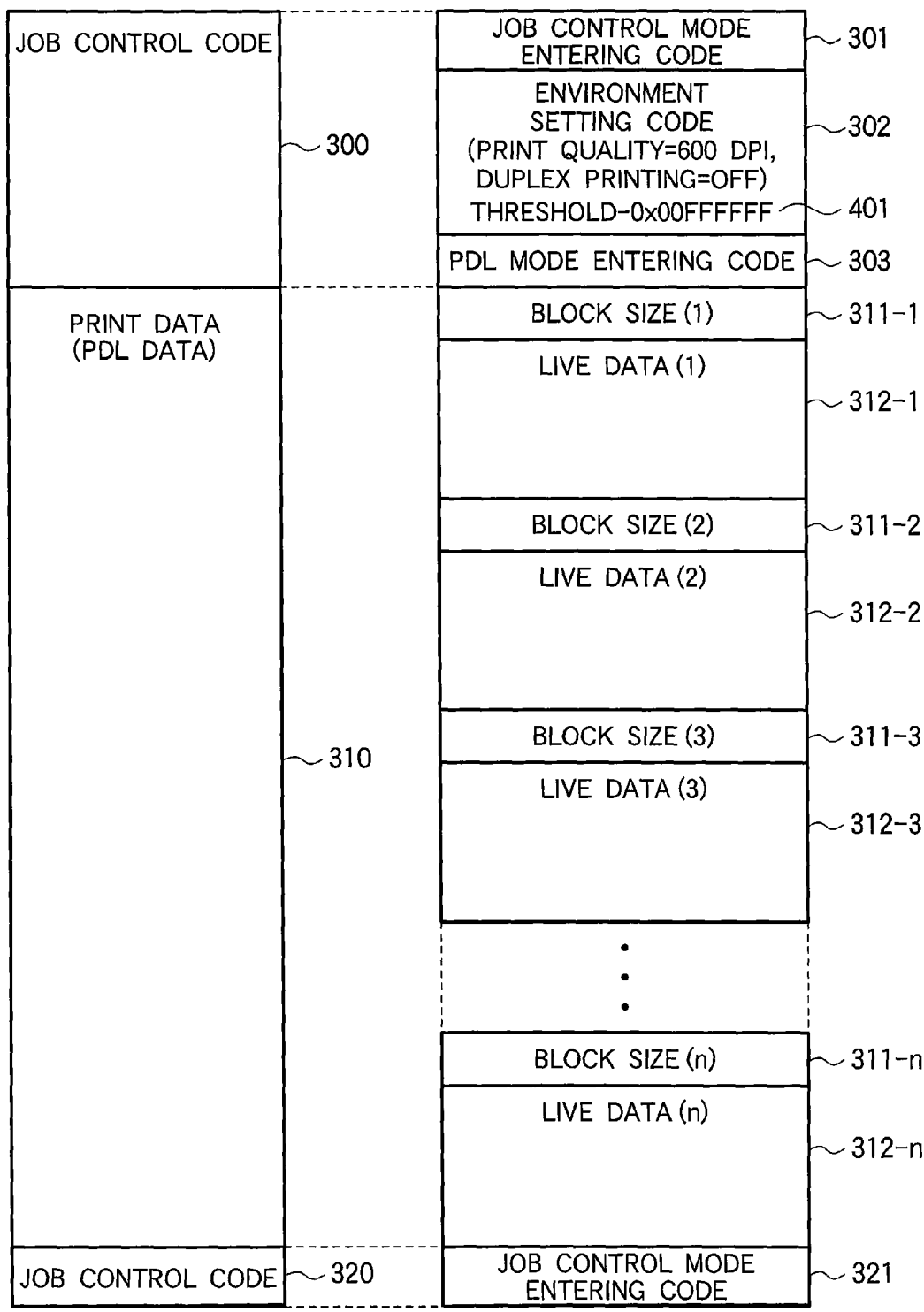
FIG. 11 illustrates an example of the print environment setting code.

The job control code section 300 includes a job control mode entering code 301, a print environment setting code 302, and a PDL mode entering code 303. The print environment setting code 302 describes print quality, duplex printing, and a threshold. FIG. 11 illustrates an example of the print environment setting code 302 in which print quality is 600 dpi, duplex printing is "OFF", and the threshold is "00FFFFFF" (H).

The threshold has a structure in which an upper most byte is "00" (H) and the rest of the bytes do not have "00" (H). Just as in the first embodiment, if there is a chance of data missing two bytes, each BLOCK SIZE should consist of three bytes or more and the upper most two bytes of the threshold should be, for example, "0000" (H).

The operator may set a small threshold in accordance with the communication environment if there is a high chance of missing data. Alternatively, the operator may set a large threshold if there is a low chance of missing data. Still alternatively, the threshold may be set in accordance with the type of printer or the interface. Yet alternatively, the number of occurrences of missing data may be recorded in the printer 110 so that the threshold is modified in accordance with the number of occurrences.

Just as in the first embodiment, the print data section 310 includes a plurality of BLOCK SIZEs and corresponding LIVE DATA. The final job control code section 320, the BLOCK SIZE 311-1, 311-2, . . . 311-n, and LIVE DATA 312-1, 312, 2, . . . 312-n are the same as those in the first embodiment.

{Operation}

Figure 12:
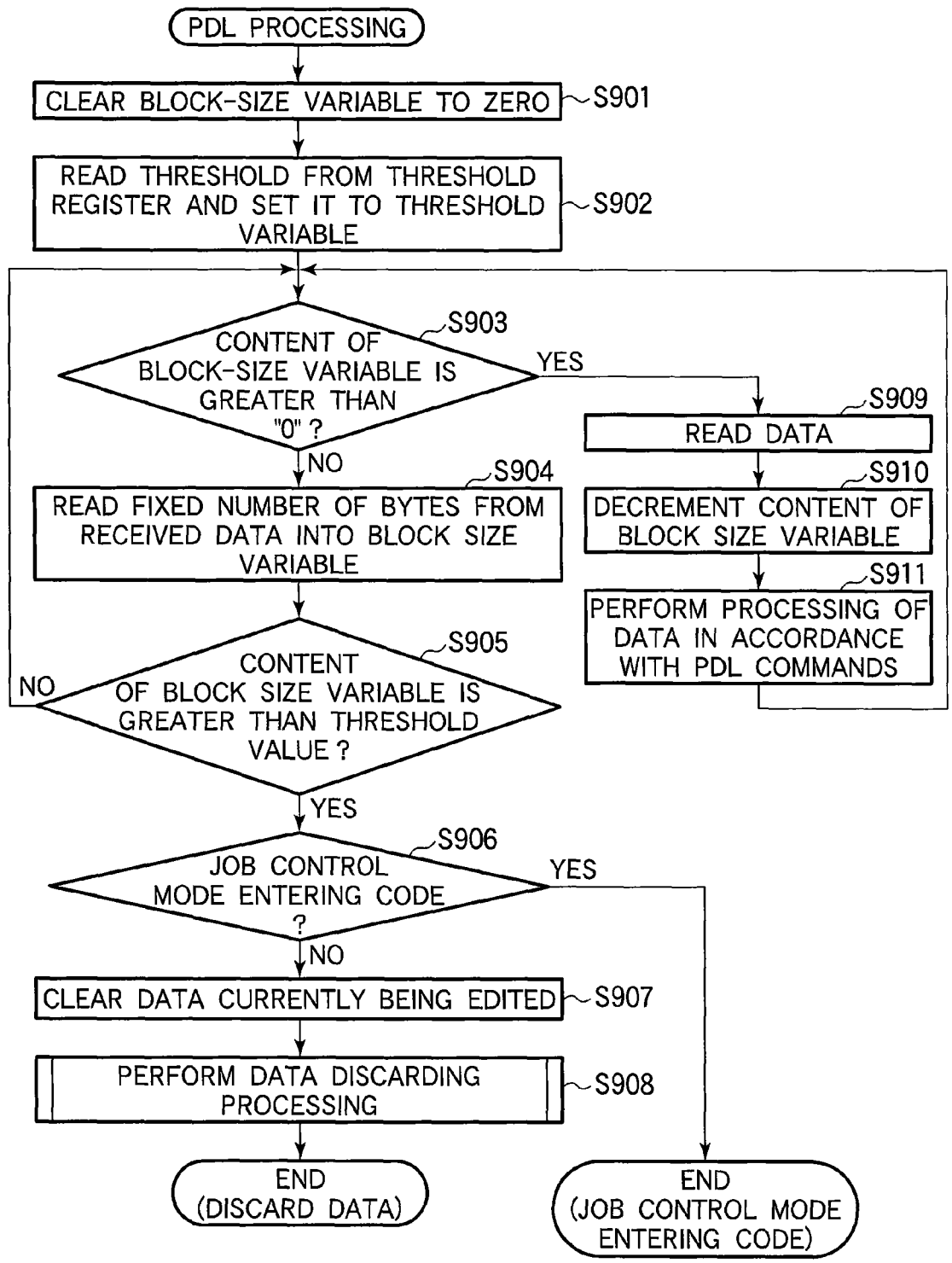
FIG. 12 is a flowchart illustrating the operation of the printer according to the second embodiment.

FIG. 12 is a flowchart illustrating the operation of the printer according to the second embodiment. The operation will be described with reference to FIG. 4 and FIG. 12. The printer according to the second embodiment operates as follows: The steps S901, S903, S904, and S906-S911 are the same as steps S801-S803, and S805-S810 in the first embodiment.

{Print Job Processing}

Print job processing, job control processing, and data discarding processing are generally the same as those in the first embodiment (FIGS. 5, 6, and 8). For the sake of simplicity, the description of like portions is omitted. The respective items of processing are also terminated when data cannot be received within a predetermined time length or when an EOF packet is received through the network. The description is omitted for the sake of simplicity.

The print job processing begins at step S502 in FIG. 5. At step S502, the job control processing illustrated in FIG. 6 is carried out. At steps S701-S705 in FIG. 6, a print job processing section 112 (FIG. 9) reads the job control code 300 which is a header of the received data. Then, the job control processing section 121 stores various print settings such as print quality and duplex printing, described as a print environment setting code 302, into a settings storing section 123. Then, the program proceeds to the next PDL processing.

Because the print environment setting code 302 holds a threshold that is a criterion to determine whether there is missing data, the threshold is stored into a threshold register 123a of the settings storing section 123, and then the program proceeds to the next PDL processing.

{PDL Processing Performed in Print Job Processing}

The processing in FIG. 12 is performed in the PDL processing at step S504. First, the BLOCK SIZE VARIABLE is cleared to zero (step S901). Then, the threshold is read from the threshold register 123a and is set to the THRESHOLD VARIABLE which is a variable in the PDL processing (step S902).

The job control processing section 121 reads BLOCK SIZE 311 (steps S903 and S904) into the BLOCK SIZE VARIABLE, and compares the content of the BLOCK SIZE VARIABLE with the content of the THRESHOLD VARIABLE (step S905). If the content of the BLOCK SIZE VARIABLE is within the content of the THRESHOLD VARIABLE (NO at step S903), the job control processing section 121 reads the data in BLOCK SIZE 311 (steps S909-S911). The steps S903-S905 and S909-S911 are repeated until data in the final block, i.e., BLOCK SIZE(n) is read.

For example, if normal data as shown in FIG. 4A is received, the job control processing section 121 reads the content of BLOCK SIZE (1), not shown, and then the content of BLOCK SIZE (2), and finally BLOCK SIZE(n). The content of BLOCK SIZE(n) is "00018510" (H) (i.e., position X). The content of content of BLOCK SIZE(n) is compared with the threshold "00FFFFFF" (H). The content of BLOCK SIZE (n) is smaller than the threshold. Thus, the job control processing section 121 reads as large an amount of data as specified by "18510" (H), the data being the endmost LIVE DATA (n) 312-n.

Then, a check is made to determine whether the content of BLOCK SIZE VARIABLE is a part of the job control mode entering code 321 (step S906). If the answer is YES, then the PDL processing is terminated.

For BLOCK SIZE (n) in FIG. 4A, the job control processing section 121 reads 4 bytes (i.e., "1B252D31" (H)) from position Z into the BLOCK SIZE VARIABLE, and then compares the 4 bytes (i.e., "1B252D31" (H)) in the BLOCK SIZE VARIABLE with the threshold value (i.e., "00FFFFFF" (H)) in the THRESHOLD VARIABLE. Because the threshold value "00FFFFFF" (H) is larger than the 4 bytes ("1B252D31" (H)), the program proceeds to S906 where the job control processing section 121 compares the 4 bytes (i.e., "1B252D31" (H)) in the BLOCK SIZE VARIABLE with upper 4 bytes ("1B252D31" (H)) of the job control mode entering code "1B252D313233343558" (H). They are coincident and therefore the PDL processing is terminated normally.

If the content of the BLOCK SIZE VARIABLE is larger than the threshold and differs from the job control mode entering code, it is determined that there is missing data. In order to prevent abnormal printing, the data for a page, which is being currently edited and has not been sent to the print controlling section 113, is cleared (step S907). Then, the discarding processing (steps S801 and S802) in FIG. 8 is performed where the job processing section 112 reads and discards subsequent data until the job control mode entering code 321 is detected (step S908).

If LIVE DATA(n-1) is missing one byte in FIG. 4, the job processing section 112 reads 4-bytes starting from position X when the BLOCK SIZE(n) is read. Thus, the value of "0185101B" (H) is stored into the BLOCK SIZE VARIABLE (step S803). The content of the BLOCK SIZE VARIABLE is larger than the threshold "00FFFFFF" (H) and is not equal to the value of the upper 4 bytes of "1B252D31" (H) of the job control mode entering code "1B252D313233343558" (H). Thus, the data is discarded, and the PDL processing is terminated.

Upon terminating the PDL processing, a check is made to determine whether the PDL processing is terminated due to detection of the job control mode entering code 321. If the PDL processing was terminated due to detection of the job control mode entering code 321, the final job control mode entering code 321 is detected at step S906 in FIG. 12, and it is determined that normal data was received so that the job control processing is further carried out.

The fact that the PDL processing was not terminated due to detection of the job control mode entering code 321 implies that data is missing by 1 byte and therefore the data discarding processing at step S908 is carried out. Thus, the printing processing is terminated.

{Advantages of the Second Embodiment}

As described above, a desired threshold may be set which is a criterion for determining whether data is abnormal. Thus, in addition to the advantages of the first embodiment, the second embodiment offers detection of abnormal communications with optimum conditions in accordance with communication environments and the type of printer.

The embodiments have been described in terms of a printer that supports page description language (PDL). The present invention is not limited to this and may be applied to various types of printers such as host base printer that directly handles bit map image.

What is claimed is:

1. A printer that prints a print job, the printer comprising:
   a receiving section that receives the print job from an external apparatus, the print job including a plurality of consecutive blocks, each block having a block size section and corresponding data to be printed, the block size section having a fixed length and containing information on the size of the corresponding data, the corresponding data immediately following the block size section, wherein the corresponding data in a block includes a first portion, a second portion, and a third portion such that if the second portion of data in a block is missing, the third portion of data is received such that the third portion of data immediately follows the first portion of data, and wherein a following block has a block size section thereof immediately following the data to be printed in the preceding block; and
   a comparing section that compares the information in the block size section of the following block with a threshold value;
   wherein if the information in the block size section of the following block exceeds the threshold value, then it is determined that the data to be printed in the preceding block is missing a portion thereof.

2. The printer according to claim 1, wherein the threshold value is set to a user's desired value.

3. The printer according to claim 1, wherein the print job further includes a job control mode entering code at the end of the plurality of blocks, wherein the discarding section discards the subsequent portion of the data when the content of the block size section is not a job control mode entering code.

4. A printing system including an information processing apparatus that produces a print job and a printing apparatus that receives the print job from the information processing apparatus and prints the print job, wherein the information processing apparatus includes:
- a dividing section that divides the print data into a plurality of blocks, each block having a block size section that has a fixed length and contains information on the size of data contained within the respective block, the corresponding data immediately follows the block size section and includes a first portion, a second portion, and a third portion;
- a job producing section that produces the print job that contains the print data that should be printed;
- a transmitting section that transmits the print job to the printing apparatus;

wherein the printing apparatus includes:
- a receiving section that receives the print job from the information processing apparatus, wherein if the second portion of data in a block is missing, the third portion of data is received such that the third portion of data immediately follows the first portion of data, and wherein a following block has a block size section thereof immediately following the data to be printed in the preceding block; and
- a comparing section that compares the information in the block size section of the following block with a threshold value;
- wherein if the information in the block size section of the following block exceeds the threshold value, then it is determined that the data to be printed in the preceding block is missing a portion thereof.

5. The printing system according to claim 4, wherein the threshold value is set to a user's desired value.

6. The printing system according to claim 5, wherein the information processing apparatus further comprises a setting section that sets the threshold value.

7. A method of printing comprising:
- dividing data, using an information processing apparatus, into a plurality of blocks each of which includes a block size section and data that should be printed, and then storing information on the size of the data contained within the respective block into the block size section;
- producing a print job, using the information processing apparatus, the print job including the data;
- transmitting the print job using the information processing apparatus;
- receiving the print job using a printing apparatus, wherein the data in a block includes a first portion, a second portion, and a third portion such that if the second portion of data in a block is missing, the third portion of data is received such that the third portion of data immediately follows the first portion of data, and wherein a following block has a block size section thereof immediately following the data to be printed in the preceding block;
- comparing the information in the block size section of the following block with a threshold value, using the printing apparatus; and
- determining, using the printing apparatus, that the data to be printed of the preceding block is missing a portion thereof if the information in the block size section of the following block exceeds the threshold value.

8. The method according to claim 7, further comprising setting the threshold value to a user's desired value.

* * * * *